May 29, 1956  W. E. SLAVENS  2,747,722
WAGON ELEVATOR SUPPORT FOR HARVESTERS
Filed June 11, 1953  2 Sheets-Sheet 1

INVENTOR.
Wayne E. Slavens
BY
Attorneys

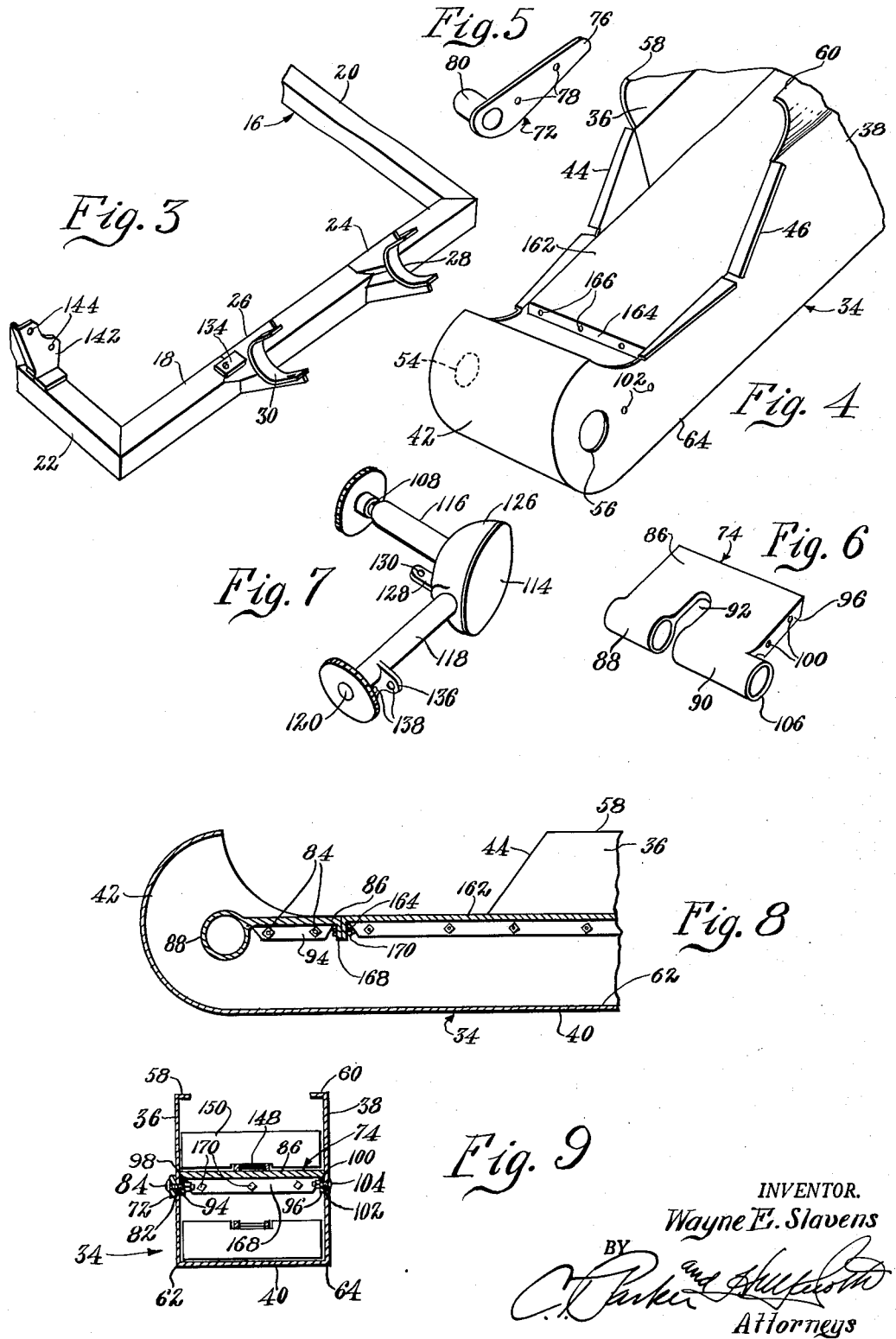

United States Patent Office 2,747,722
Patented May 29, 1956

2,747,722

WAGON ELEVATOR SUPPORT FOR HARVESTERS

Wayne E. Slavens, Des Moines, Iowa, assignor to Deere Manufacturing Co., Dubuque, Iowa, a corporation of Iowa Application June 11, 1953, Serial No. 361,007

10 Claims. (Cl. 198—122)

This invention relates to a harvester and more particularly to means for mounting on the harvester an elevator or conveyor such as the type conventionally used for conveying harvested crops from the harvester to a trailing wagon or similar vehicle.

In the ordinary harvester, of which the corn picker may be selected as typical, crops are gathered or otherwise accumulated by harvesting means and delivered to a central point from which leads a conveyor in the form of an elevator for carrying the harvested crops to a discharge point for transfer to a trailing wagon or even a separately driven vehicle. The harvesting mechanism is ordinarily carried on the mobile frame for vertical adjustment, which is important from the standpoint of adapting the units to crops of different heights, as well as to permit the units to be raised and lowered in conditions of extreme variations in ground contour. In the case of a tractor-mounted harvester, the wagon elevator projects upwardly at the rear of the tractor and when the machine is towing a wagon, extreme variations in ground contour may cause such relative angular movement between the tractor and wagon as to cause the wagon elevator to engage the wagon, thus damaging either the wagon or the elevator or both. In many instances, the gathering units or equivalent harvesting means will be raised while the tractor is passing over a high spot in the field, for example, and it has long ago been considered an expedient to interconnect the wagon elevator and harvesting unit so that as the latter raises, the motion is transmitted to the wagon elevator to raise the wagon elevator and thus to clear the wagon elevator as respects contact with the trailing wagon.

The articulate mounting of the wagon elevator to accommodate the raising and lowering mentioned above involves more than a simple pivot, since the conveyor means in the elevator must be driven and this is ordinarily accomplished from the lower end, preferably by a shaft or equivalent means coaxial with the pivot about which the wagon elevator may be raised and lowered. In many cases, it is desirable to dismantle the driving mechanism without affecting the mounting of the wagon elevator on the picker.

According to the present invention, these and other advantages are accomplished by the provision of a combined mount and driving mechanism arrangement in which the driving shaft is carried by the support exclusive of the wagon elevator, thus enabling removal of the driving mechanism without interfering with the support of the elevator on the picker. It is an important feature of the invention to provide a simple and economical construction in which the elevator, comprising upright side walls, has cross connecting these side walls a bracket having a tubular portion which projects at at least one side of the elevator to form a trunnion for sustaining the elevator on the picker. The tubular portion carries loosely therein an axially insertable and withdrawable driving shaft having at its inner end means for carrying a conveyor enclosed within the elevator and at its outer end means in the form of driving mechanism for transmitting drive to the conveyor from a convenient power source on the picker. Stated broadly, it is an important object of the invention to journal the driving shaft exclusively on the support without contact with the elevator, so that variations in manufacture or twists and strains developed during operation will not be transmitted from the driving mechanism to the elevator housing and viceversa.

The foregoing and other important objects and desirable features inherent in the invention will become apparent from the following detailed description and illustration of a preferred embodiment of the invention.

In the drawings:

Fig. 3 is a fragmentary perspective view of the main support.

Fig. 4 is a perspective view of the lower portion of the elevator housing.

Fig. 5 is a perspective view of one of the mounting means that forms a trunnion.

Fig. 6 is a perspective view of the interior bracket and trunnion means.

Fig. 7 is a perspective view of the drive mechanism assembly.

Fig. 8 is a section substantially on the line 8—8 of Fig. 2.

Fig. 9 is a transverse section substantially on the line 9—9 of Fig. 2.

Although the invention may be utilized in variations of the preferred form shown here in harvesters other than corn pickers, a tractor-mounted corn picker is selected as a simple form of illustration. Since tractor-mounted corn pickers are generally conventional and well known, only so much of a representative machine is illustrated here as is deemed necessary to orient the invention.

Figure 1:
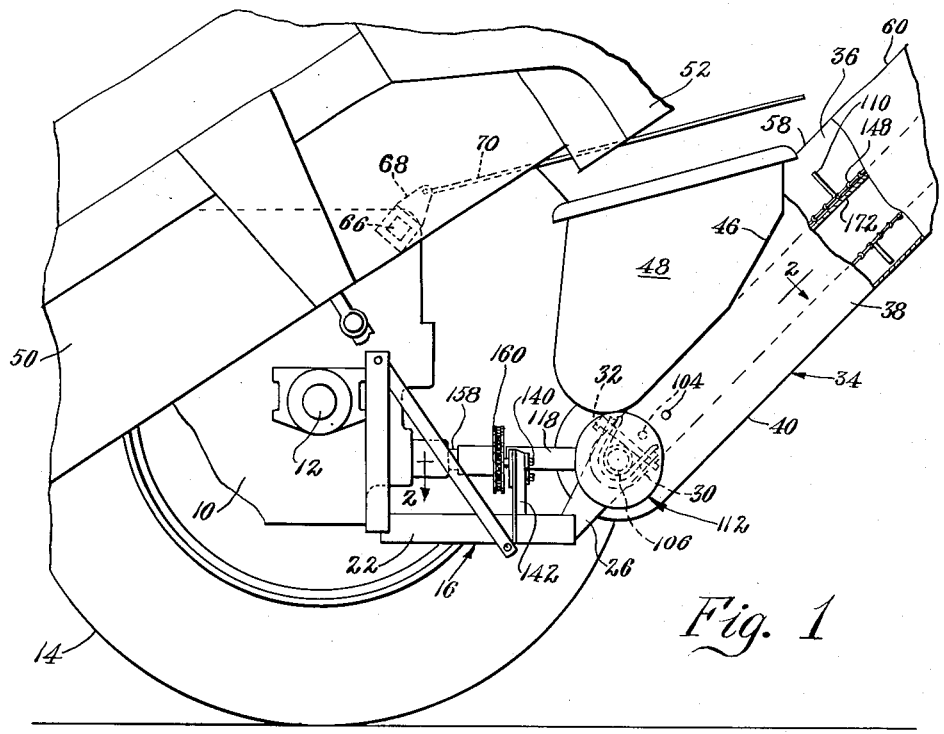
Fig. 1 is a side elevational view of a rear portion of a tractor-mounted picker, with the near wheel removed to illustrate the arrangement.
Figure 2:
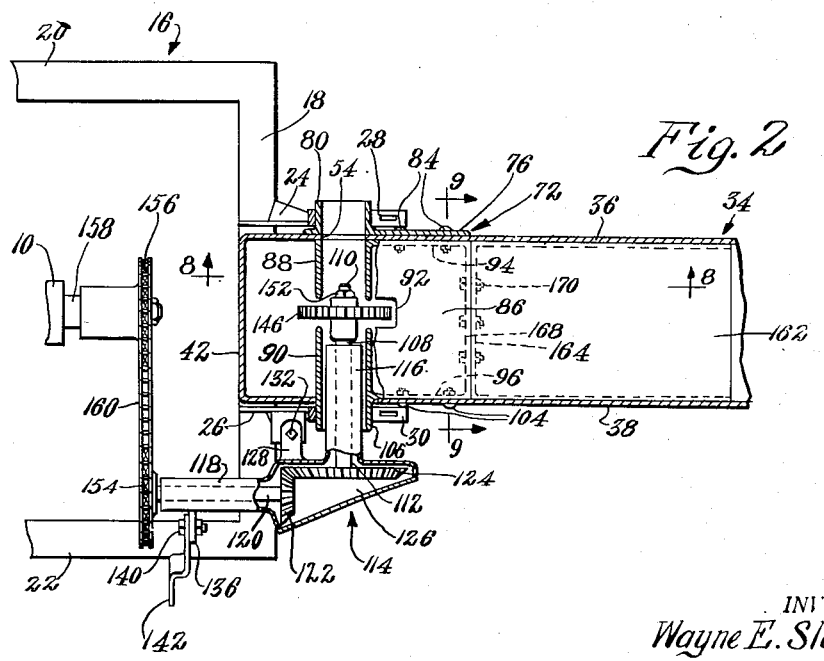
Fig. 2 is a fragmentary sectional view, taken somewhat along the line 2—2 of Fig. 1.

In Fig. 1, the numeral 10 represents the rear portion of a tractor body, from opposite sides of which extend transverse rear axles 12 (only one of which is shown). These axles each carry a traction wheel, one of which appears at 14.

The rear portion of the tractor has a drawbar, here in the form of a U-shaped support 16 having a transverse horizontal bight 18 and right- and left-hand forwardly extending legs 20 and 22. The bight 18 has rigidly secured thereto a pair of upwardly and rearwardly extending mounting elements 24 and 26. These are spaced apart along the length of the bight 18 and are provided respectively with upwardly and rearwardly opening pocket means 28 and 30. As shown in Fig. 1, each pocket means is closed by a removable latch pin 32, which structure by itself is not new here and therefore needs no further description.

The mounting elements 24 and 26 serve to carry on the support 16 an upwardly and rearwardly extending wagon evelvator housing 34. This housing has right- and left-hand sides 36 and 38, a bottom 40 and a lower curved end forming a boot 42. The side walls 36 and 38 are cut away, as at 44 and 46 (Fig. 4), to receive and accommodate a hopper 48. The tractor carries means in the form of an upwardly and rearwardly extending structure 50 which discharges at 52 into the hopper 48. The means 52 is conventionally utilized to transfer harvested crops from harvesting or gathering means (not shown) to the hopper 48. A representative disclosure to the extent set forth here appears in the U. S. patent to Slavens 2,622,382.

The housing side walls 36 and 38 are provided respectively with right- and left-hand openings 54 and 56, and these openings are alined on an axis parallel to the bight 18 of the drawbar or support 16. The axis of the openings 54 and 56 lies below the level of upper edges 58 and 60 respectively on the housing side walls 36 and 38. The side walls of the housing respectively have lower edges 62 and 64 defined by the junctions of the side walls with the housing bottom 40.

When the elevator housing 34 is in its mounted position on the support 16 (Fig. 1), the side wall openings 54 and 56 are coaxial with the pocket means 28 and 30 of the mounting elements 24 and 26, and the elevator housing 34 is sustained by the support 16 for angular movement about the axis just referred to.

The tractor is conventionally provided with a transverse power-operated rockshaft 66 on which is fixed an arm 68. The arm is connected by a rod 70 to an upper portion of the elevator housing 34 so that upon rocking of the rockshaft, the angular position of the elevator housing relative to the support 16 is changed. As already suggested, the broad idea of mounting a wagon elevator for adjustment about a transverse axis is not a stupendous achievement by itself by the annals of corn picking and therefore needs no further elaboration. See, for example, the U. S. patent to Hyman Reissue 22,279.

According to the present invention, the novel mounting of the elevator housing 34 on the support 16 comprises a pair of members designated generally by the numerals 72 and 74, best illustrated by themselves in Figs. 5 and 6.

As shown particularly in Fig. 5, the member 72 is in the form of a casting having an upright plate-like portion 76 apertured at 78 and including an integral tubular member forming a hollow trunnion 80. The member 72 is assembled against the right-hand housing side wall 36 with the trunnion 80 in register with the side wall opening 54 and with the apertures 78 in register with apertures 82 (Fig. 9) in the side wall 36. Securing means in the form of bolts 84 are used to mount the member 72 rigidly on the elevator housing.

The member 74 is in the form of a casting or bracket having a plate portion 86 of relatively substantial area and an integral tubular portion made up of coaxial tubular parts 88 and 90 separated by a recess 92 extending back into the plate portion 86. The plate-like portion 86 is flanged at its opposite sides, as at 94 and 96, and these flanges are respectively apertured at 98 and 100. The apertures 98 in the flange 94 receive the bolts 84 previously described. The apertures 100 in the flange 96 register, when the bracket is assembled in the housing, with apertures 102 in the left-hand side wall 38 of the housing 34, and bolts 104 are utilized as securing means for rigidly mounting the bracket in place such that it cross-connects the side walls 36 and 38.

As best shown in Fig. 6, the tubular portion 90 is longer than its coaxial tubular portion 88 and therefore projects axially outwardly through the side wall opening 56 to establish a second trunnion means 106 cooperative with or receivable in the pocket means 30 of the left-hand mounting element 26 on the support 16. Thus, the trunnion means 80 and 106 are receivable by the mounting elements 24 and 26 to carry the elevator housing 34 on the support for angular movement about the axis of the trunnion means. The trunnion means are retained in the support element pocket means by the latch pins, such as previously described at 32 (Fig. 1).

From the description thus far, it will be seen that the elevator housing 34 is sustained on the support and it may be adjusted angularly by means of the rockshaft 62, arm 68 and rod 70. By removal of the latch pins 32, the elevator housing may be bodily removed from the support.

As stated above, a further feature of the invention is the provision of drive means carried by the support independently of or free from the elevator housing. This drive means includes a transverse shaft 108 having an inner terminal end portion 110 within the housing 34 and an outer terminal end portion 112 outside of or external to the housing 34. This shaft is carried by bearing means designated generally by the numeral 114 and here comprising a gear casing having first and second angularly related sleeves 116 and 118. The sleeve 116 surrounds the shaft 108 and projects axially and loosely through the tubular trunnion means 90—106, terminating at its inner end short of the innter terminal end 110 of the shaft 108. The sleeve 116 provides an adequate journal or bearing for the shaft 108 and the shaft 108 is thus out of contact with the trunnion means 106, tubular portions 88 and 90 and elevator housing 34. The other sleeve 118, being rigid with the gear casing or bearing means, provides a suitable support for a longitudinal driving shaft 120 which has at its inner end within the gear casing a bevel pinion 122 in constant mesh with a bevel gear 124 keyed to the outer terminal end portion 112 of the shaft 108. Thus, the bearing means 114 is self-contained, including the sleeves 116 and 118 which respectively journal the shafts 108 and 120. The intermediate portion of the gear casing, at the juncture of the sleeves 116 and 118 and designated by the numeral 126, has rigid thereon an attaching ear 128 apertured at 130 to receive securing means in the form of a bolt 132 for removably mounting the gear casing on an apertured ear 134 rigid on the left-hand mounting element 26 of the main support 16. The forward portion of the forwardly extending bearing means sleeve 118 has rigid thereon a lug or ear 136 apertured at 138 to receive securing bolts 140 which provide removable securing means for attaching the bearing means to an upstanding bracket 142 rigid on the left-hand leg 22 of the main support 16. The bracket 142 is apertured at 144 to receive the bolts 140.

Since the sleeve 116 is loosely received in the tubular portion 90 of the internal bracket member 74, variations in manufacture, such as might occur in the relationship of the mounting lugs 128 and 136 to the support-carried ears 134 and 142 will not affect the pivotal mounting of the housing 34 on the support 16. Likewise, twisting of the housing 34 during operation will not impart any undue forces to the driving mechanism.

The internal terminal end 110 of the shaft 108 carries thereon a driven member in the form of a sprocket 146 about which is trained a conveyor in the form of an endless chain 148 having material-engaging paddles 150. The chain in many respects is of conventional construction and itself forms no part of the present invention. As outlined above, the plate portion 86 of the bracket member 74 is below the level of the upper edges 58 and 60 of the housing side walls 36 and 38 and consequently is in a position to sustain and/or support portions of the upper run of the conveyor chain 148 (Fig. 9). The driven member or sprocket 146 is accommodated by the recess 92 that separates the bracket member tubular portions 88 and 90. The sprocket 146 is preferably secured to the shaft 108 by a nut 152. Since the tubular portion 88 is open at both ends and since it is in register with the tubular part 80 of the bracket 72, access may be had axially to the nut 152 for removing and installing the sprocket 146.

The shaft 120 in the tubular portion 118 of the housing 114 has keyed to its forward end a driving sprocket 154. This sprocket is coplanar with a sprocket 156 keyed to the rear end of a power take-off shaft 158, which may be a conventional part of the tractor, as is generally conventional. A driving chain 160 interconnects the sprockets 154 and 156 for transmitting drive to the elevator conveyor sprocket 146.

Another feature of the invention resides in the guide plate for the upper run of the conveyor chain 148. This plate is designated generally by the numeral 164 and has its forward transverse edge flanged at 164 for cooperation with a transverse flange 168 on the rear edge of the bracket 74. Bolts 170 connect the two flanges and thus mount the plate 162 rigidly as a continuation of the plate-like portion 86 of the bracket 74. The plate 162 is in effect a downward continuation also of an intermediate plate 172 (Fig. 1) over which the upper run of the conveyor 148 runs. The separability of the plate 162 from the bracket 74 permits the bracket to be readily removed. At the same time, the bracket is of substantial construction and affords adequate support to the plate 162 in that portion of the conveyor housing proximate to the driving sprocket 146 and its related components.

Specific features of the invention not enumerated herein, as well as other aspects of the invention in broader form, will undoubtedly occur to those versed in the art, as likewise will numerous modifications and alterations in the preferred embodiment of the invention illustrated, all of which may be achieved without departing from the spirit and scope of the invention.

What is claimed is:

1. A wagon elevator mounting for a harvester, comprising: a support having thereon a pair of spaced apart and alined mounting elements; an elevator housing having opposite upright side walls spaced apart on the order of and received between the mounting elements, at least one of said walls having an opening therein alined with the proximate mounting element; a pair of alined trunnions, one fixed to each side wall, respectively received by the mounting elements to sustain the elevator housing on the support, one of said trunnions being hollow and in register with the aforesaid side wall opening; a single shaft projecting through the hollow trunnion and said side wall opening and having an inner end including a driven portion within the housing and an outer end including a driving portion outside the housing, said shaft being out of contact with said trunnions and any part of the elevator housing; and means fixed rigidly to the support outside and out of contact with the elevator housing and trunnions and journaling the shaft solely at its outer end so that the shaft extends into the housing as a cantilever.

2. The invention defined in claim 1, in which: the shaft journaling means includes a bracket rigid on the support and a sleeve rigid on the bracket and surrounding the shaft and extending loosely through the hollow trunnion and the side wall opening, said sleeve including a coaxially elongated bearing for the shaft.

3. A wagon elevator mounting for a harvester, comprising: a support having thereon a pair of spaced apart and alined mounting elements; an elevator housing having opposite upright side walls spaced apart on the order of and received between the mounting elements, at least one of said walls having an opening therein alined with the proximate mounting element; a pair of alined trunnions, one fixed to each side wall, respectively received by the mounting elements to sustain the elevator housing on the support, one of said trunnions being hollow and in register with aforesaid side wall opening; a gear casing exteriorly of the housing and coaxial with the hollow trunnion and side wall opening; means connected to the gear casing and to the support for supporting the gear casing on the support out of contact with both the elevator and the trunnions; and a single shaft having an outer end portion journaled in the gear casing independently of the elevator housing and trunnions and projecting as a cantilever axially and loosely into the elevator housing through and out of contact with the hollow trunnion and side wall opening.

4. The invention defined in claim 3, in which: the gear casing includes a bearing portion external to and out of contact with the elevator housing and trunnions and projecting normally to the shaft and into proximity to the support; means rigidly connecting the bearing portion exclusively to the support; a second shaft journaled in the bearing portion exclusively of the housing and trunnions and extending into the gear casing; and drive means in the gear casing and interconnecting the two shafts.

5. A wagon elevator mounting for a harvester, comprising: a support having thereon a pair of spaced apart and alined mounting elements; an elevator housing having opposite upright side walls spaced apart on the order of and received between the mounting elements, at least one of said walls having an opening therein alined with the proximate mounting elements; a rigid bracket within the elevator housing and cross-connecting and fixed to the side walls, said bracket having an integral portion thereon projecting outwardly through the side wall opening to form a trunnion received by the proximate mounting element; a second and coaxial trunnion carried by the other side wall and received by the other mounting element; and a shaft extending coaxially and loosely through the hollow trunnion and side wall opening and having an outer end journaled exclusively on the support exteriorly of the elevator housing so as to project as a cantilever into the housing.

6. The invention defined in claim 5, in which: the shaft has an inner terminal end portion substantially midway between the side walls; the bracket is provided with a recessed portion alined with said terminal end portion; and a driven member is carried by the shaft at said terminal end portion, said driven member being accommodated by the recessed portion of the bracket.

7. A wagon elevator mounting for a harvester, comprising: a support having thereon a pair of spaced apart and alined mounting elements; an elevator housing having opposite upright side walls spaced apart on the order of and received between the mounting elements, said side walls having openings therein alined with the mounting elements; a rigid bracket within the elevator housing and cross-connecting and fixed to the side walls, said bracket having an integral portion thereon at one side thereof and projecting outwardly through the proximate side wall opening to provide a first hollow trunnion received by the proximate mounting element; a second coaxial hollow trunnion carried by the other side wall in register with said other side wall opening; a shaft extending from outside the housing into the housing via one of the hollow trunnions and its associated side wall opening; means cooperative between the shaft and the support exteriorly of the housing and journaling the shaft exclusively on the support; a driven member on the shaft within the housing; and means on the shaft within the housing and removably securing the driven member on the shaft, said securing means being axially accessible through the other hollow trunnion and its associated side wall opening.

8. A wagon elevator mounting for a harvester, comprising a support; an elevator housing having spaced apart upright sides said housing being positioned proximate to the support and at least one of the side walls having an opening therethrough; means rigid on the housing and including trunnion means coaxial with the side wall opening and engaging the support to sustain the housing for angular movement relative to the support about the axis of the trunnion; an axially insertable and withdrawable shaft extending loosely through and out of contact with the trunnion and the side wall opening and having an inner terminal end within the housing and an outer termial end outside the housing; and bearing means journaling the shaft solely at its outer end so that the shaft projects into the housing as a cantilever, said bearing means being removably secured to the support exclusively of the housing and trunnion means.

9. A wagon elevator mounting for a harvester, comprising a support; an elevator housing having spaced apart upright sides, said housing being positioned proximate to the support and said side walls including upper and lower edges and further having coaxial openings therethrough; bracket means cross-connecting and rigidly fixed to the side walls and including a plate-like portion below and generally paralleling the side wall upper edges and an integral tubular portion coaxial with the side wall openings, at least one end of the tubular portion projecting axially outwardly through the proximate side wall opening to serve as a trunnion engaging the support and sustaining the housing; a shaft coaxially and loosely received in the tubular portion and having an outer end portion outside the housing; means journaling the shaft at its outer end portion and secured to the support exclusively of the housing; a driven member carried by the shaft within the housing; a conveyor trained over the driven member and passing over and sustained by the plate-like portion of the bracket; and a plate member cross-connecting the side walls as an extension of the plate-like portion of the bracket and lying beneath and sustaining additional portions of the conveyor.

10. A wagon elevator mounting for a harvester, comprising a support; an elevator housing having spaced apart upright sides, said housing being positioned proximate to the support and said side walls including upper and lower edges and further having coaxial openings therethrough; bracket means cross-connecting and rigidly fixed to the side walls and including a plate-like portion below and generally paralleling the side wall upper edges and an integral tubular portion coaxial with the side wall openings, at least one end of the tubular portion projecting axially outwardly through the proximate side wall opening to serve as a trunnion engaging the support and sustaining the housing; a shaft coaxially and loosely received in the tubular portion and having an outer end portion outside the housing; means journaling the shaft at its outer end portion and secured to the support exclusively of the housing; a driven member carried by the shaft within the housing; and a conveyor trained over the driven member and passing over and sustained by the plate-like portion of the bracket.

References Cited in the file of this patent
UNITED STATES PATENTS

| | | |
|---|---|---|
| Re. 21,542 | Oehler, et al. | Aug. 27, 1940 |
| 985,991 | Fiebach et al. | Mar. 7, 1911 |
| 1,460,952 | Eustis | July 3, 1923 |
| 2,444,561 | Fergason | July 6, 1948 |
| 2,644,570 | Russell | July 7, 1953 |